May 20, 1941.                W. J. RUSSELL ET AL                2,242,328
                                COOKING APPLIANCE
                             Filed Nov. 30, 1938         2 Sheets-Sheet 1

WITNESSES:

INVENTOR
WILLIAM J. RUSSELL
JOSEPH R. HEILMAN
BY
ATTORNEY

Patented May 20, 1941

2,242,328

UNITED STATES PATENT OFFICE 2,242,328

COOKING APPLIANCE

William J. Russell and Joseph R. Heilman, Mansfield, Ohio, assignors to Westinghouse Electric & Manufacturing Company, East Pittsburgh, Pa., a corporation of Pennsylvania Application November 30, 1938, Serial No. 243,283

6 Claims. (Cl. 219—35)

Our invention relates to a cooking appliance, more particularly to a heating unit therefor having a handle rotatable to an operative position in which it projects from the heating unit, and to an inoperative position, in which it may overlie the heating unit.

An object of the invention is to provide a simple and inexpensive means for releasably retaining the handle in operative position.

The above and other objects are effected by our invention as will be apparent from the following description and claims taken in connection with the accompanying drawings, forming a part of this application, in which:

Figure 1:
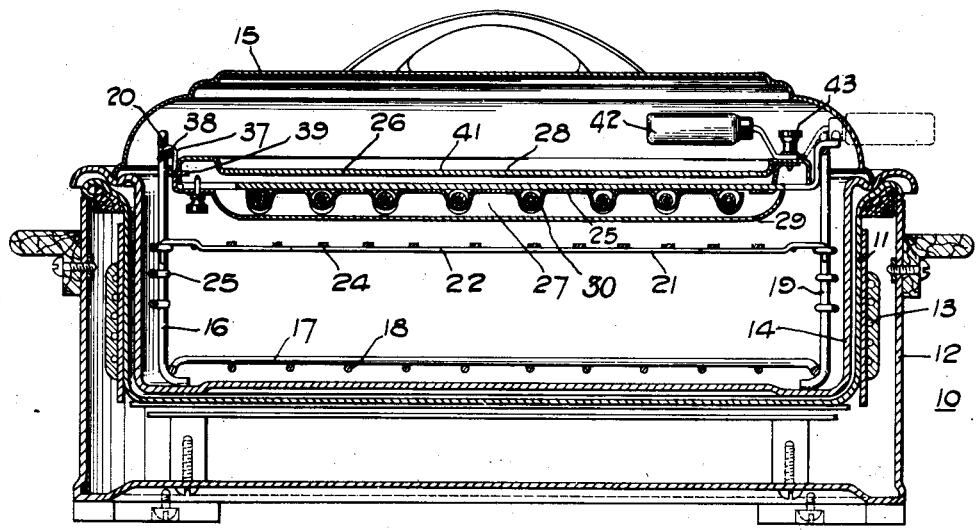
Fig. 1 is a longitudinal vertical section of a cooking appliance constructed in accordance with my invention.
Figure 2:
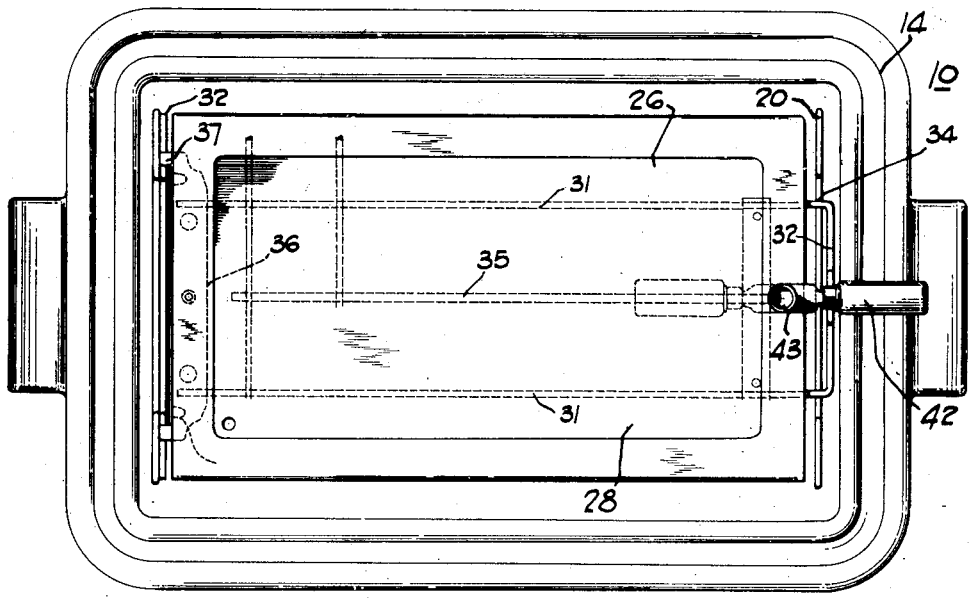
Fig. 2 is a plan view of the appliance shown in Fig. 1, with the cover removed.

Referring to the drawings in detail, we show an electric roaster body 10, comprising an inner casing 11 and an outer casing 12 arranged with their corresponding walls in spaced relation, a heating element 13 being provided on the inner casing as shown. A removable inset pan or liner 14 may also be provided within the inner casing 11. As will be noted from the drawings, the roaster body includes bottom, side, and end walls and is open at the top. A cover 15 is adapted to rest on the flange of the inset pan 14 to provide a complete closure for the open top of the roaster body.

A rack 16 is provided inside the roaster. It includes longitudinal members 17 and transverse members 18 providing a grill or platform for supporting articles of food and food containers to be heated by the electric heating element 13. The rack further comprises pieces of wire bent to inverted U-shape to provide corner posts or vertical members 19 and cross bars 20 extending between the vertical members 19 at the ends of the roaster to provide handles or bails for lifting the rack 16 out of the roaster.

A shelf 21 is provided for holding articles of food to be broiled. The shelf 21 is in the form of a grid or grill comprising longitudinal members 22, and transverse bars 24. It is supported on cross bars 25 extending between and secured to the vertical members 19 at the opposite ends of the rack. A plurality of sets of cross bars 25 are provided so that the shelf may be supported at different heights.

A heating unit 26 is hingedly and removably mounted on the rack 16 adjacent the top of the roaster body. It is adapted to radiate heat downwardly for broiling articles of food on the shelf 21 and it is also adapted for frying or other cooking directly on the heating unit. The heating unit comprises a heating device 27 including a wire frame and a resistance wire mounted thereon, a sheet metal member 28 detachably connected thereto on the upper side, and a heat reflector 29 detachably connected thereto on the lower side.

The heating device 27 comprises a wire frame including one element bent to U-shape and including two longitudinal members 31 and a transverse member 32 connected to the longitudinal members 31 by vertical connecting portions 33 and horizontal connecting portions 34. The frame further includes a central longitudinal member 35. At the left-hand end, as seen on the drawings, the longitudinal members are connected by a bracket 36, which is formed with straps bent to inverted U-shape to provide hinge portions 37. The latter are adapted to engage a cross bar 38 of the rack for hingedly supporting the left-hand end of the heating unit on the rack. The bracket 36 is also formed with projections 39 extending through slots in the adjacent flange of the sheet metal member 28 to form part of the detachable connection between the heating device and the sheet metal member. The heating device 27 includes a resistance wire 30 mounted on the wire frame in a conventional manner.

At the opposite end, the connecting portions 34 rest directly on the cross bars 20 at the right-hand end of the rack. The upper surface of the sheet metal member 28 is formed so that the central portion thereof indicated at 41 is substantially flat and is encompassed by a raised or rim portion so that it is suitable for frying or other cooking thereon. The heat reflector 29 is adapted to reflect heat upwardly onto the sheet metal member 28 for such frying or other cooking. The lower surface of the sheet metal member 28 serves to reflect radiant heat downwardly for broiling articles of food on the shelf when the reflector 29 is removed.

Figure 3:
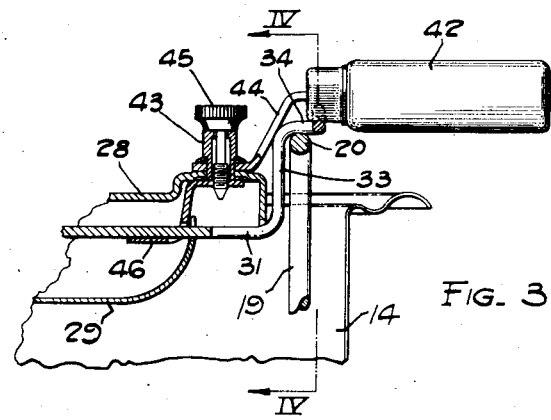
Fig. 3 is an enlarged detail view, partly in section, showing the means for locking the handle in operative position.

A handle 42 is mounted on the sheet metal member 28 adjacent the right-hand edge thereof. It is mounted by means of a tubular member 43 which is peened to the sheet metal member 28 and which has a neck portion of reduced diameter extending through an opening in the handle strap 44. The handle is thus mounted on a vertical axis, perpendicular to the heating unit, and it is adapted to be moved either to operative position, as shown in Fig. 3, in which it projects from the heating unit, or to overlie the heating unit as shown in Fig. 1. The latter position permits the cover 15 to be placed on the roaster body as shown in Fig. 1. A special screw 45 extends through the member 43 and is threaded through an opening in a bracket 46 carried by the heater frame, to complete the detachable connection between the heating element and the sheet metal member 28.

Figure 4:
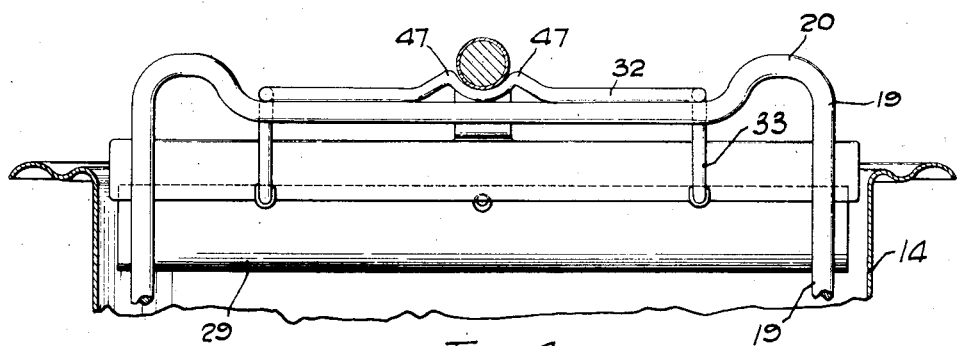
Fig. 4 is an end elevation, partly in section, as seen along the line IV—IV of Fig. 3; and, Figs. 5 and 6 are detail views of two modifications.

In accordance with the present invention, the transverse member 32 of the heating element frame is formed to retain the handle 42 in operative position. It is preferably formed to provide two projections 47 on opposite sides of the handle as most clearly shown in Fig. 4. The portion between the projections 47 is preferably concaved or saddle shaped as shown in Fig. 4 to fit the adjacent portion of the handle 42.

In the present construction, advantage is taken of the inherent resiliency of the heater frame and of the handle strap 44 to provide for releasing the handle 42 from operative position. To move the handle from operative position to inoperative position, the handle and the transverse member 32 are forcibly separated, causing the strap 44 and the heating element frame to flex until at least one of the projections 47 is moved out of the path of the handle 42. The latter is then rotated about the vertical axis on which it is mounted until it overlies the heating unit as shown in Fig. 1.

Figure 5:
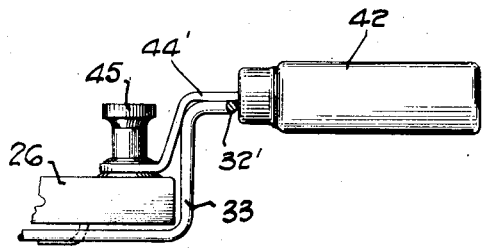

In Fig. 5 there is shown a modified construction in which the transverse member 32' extends directly beneath the handle strap 44' and immediately adjacent the end of the handle 42. The handle is retained in operative position since rotary movement from operative position results in abutment of the end of the handle against the transverse member 32'. The handle may be moved to inoperative position in the same manner as in the first embodiment, namely, by forcibly separating the transverse member 32' and the handle 42, such separation being permitted by the inherent resiliency of the heating element frame and the strap 44'.

Figure 6:
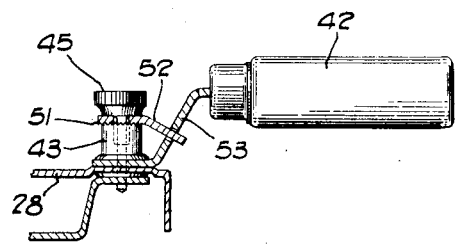

In the modified construction shown in Fig. 6, a washer 51 is secured between the tubular member 43 and the head of the thumb screw 45. It is formed with a tongue 52 extending therefrom through a slot in the strap handle 53. The upper surface of the tubular member 43 and the lower portion of the washer 51 are knurled to prevent rotation of the washer when the thumb screw 45 is tightened. In this embodiment, the handle 42 is retained in operative position by interlocking engagement with the projecting tongue 52. To turn the handle to inoperative position overlying the heating unit, the thumb screw 45 is backed off a few turns until the washer 51 is free to rotate with the handle 42.

While we have shown our invention in several forms, it will be obvious to those skilled in the art that it is not so limited, but is susceptible of various other changes and modifications without departing from the spirit thereof, and we desire, therefore, that only such limitations shall be placed thereupon as are imposed by the prior art or as are specifically set forth in the appended claims.

What we claim is:

1. A heating unit adapted for use adjacent the top of an open top receptacle and comprising a heat shield, a heating device attached to said heat shield and comprising a wire frame and a resistance wire carried thereby, a handle rotatably mounted on said heat shield at one end thereof so as to be rotatable to operative position, in which the handle projects from the unit, said wire frame including two longitudinal members joined by a transverse member which extends adjacent said handle when in operative position and which is adapted to resiliently engage said handle to maintain the same in such position.

2. A heating unit comprising a heating device including a wire frame and a heating element carried by said frame, a heat reflector above the heating element, hinge means adjacent one edge of the unit, and a handle rotatably mounted adjacent the opposite edge of the unit on an axis normal to the unit and so as to be rotatable to operative position, in which the handle projects from the unit, and to inactive position, in which the handle overlies the unit, said wire frame having two members extending along opposite sides of the heating device and projecting beyond said heat reflector at said opposite edge and a third member connected to the projecting portions of said two members, said third member being offset from the plane of said two members and disposed to engage said handle when in operative position for releasably retaining the same in such position.

3. A heating unit comprising a wire frame, a resistance heater carried by said frame, hinge means carried by the heating unit for hinging the same on a support, and a handle rotatably mounted on the heating unit so that it may be turned to project from the unit in operative position or turned to overlie the heating unit in inoperative position, said handle, when in operative position, providing a means for swinging the heating unit about the axis of said hinge means, said wire frame being formed with two integral projections disposed to retain said handle therebetween in operative position, at least some of said parts being sufficiently resilient to permit at least one of said projections to disengage said handle for turning the same to inoperative position.

4. In an electric cooking appliance having two spaced horizontal bars, a heating unit mounted on said bars and comprising a heating device, a heat reflector above the heating device, means for hinging the unit adjacent one edge thereof on one of said bars, a handle rotatably mounted on said unit adjacent the opposite edge on an axis normal to the unit and so as to be rotatable to operative position, in which the handle projects from the unit, and to inactive position, in which the handle overlies the unit, said heating device including a frame and a resistance heater mounted thereon, said frame having portions projecting beyond said heat reflector at said opposite edge, said projecting portions including a portion resting on the other of said horizontal bars and including a portion yieldably engaging said handle to retain the same in operative position.

5. A heating unit adapted to be mounted in horizontal position in a cooking appliance and comprising a heat reflector and a heating device below the reflector, said heating unit having a handle mounted thereon and rotatable about a vertical axis so that it may be turned to project from the heating unit in operative position or to overlie the heating unit in inoperative position, said heating device including a wire frame and a resistance heating element carried thereby, said wire frame being bent to form two projections for retaining said handle in operative position therebetween, some of the parts of the heating unit being sufficiently flexible and formed so that said handle and at least one of said projections may be disengaged to turn said handle from operative to inoperative position.

6. A heating unit comprising a heating device including a frame and a heating element carried by the frame, a sheet metal heat reflector above the heating device, a handle mounted on said sheet metal member so as to rotate about an axis normal to said sheet metal member between an operative position, in which the handle projects from the unit, and an inactive position, in which the handle lies adjacent the sheet metal member, said wire frame having a portion extending under said handle when in operative position and formed with projections on opposite sides thereof for retaining the handle in said operative position, one of said projections and said handle being adapted to be moved relative to each other sufficiently to free said handle and permit the same to be moved from said operative position to said inactive position.

WILLIAM J. RUSSELL.
JOSEPH R. HEILMAN.